(12) United States Patent
Winkler et al.

(10) Patent No.: US 12,449,398 B2
(45) Date of Patent: Oct. 21, 2025

(54) RESONATOR ARRAY PANEL

(71) Applicant: Raytheon Technologies Corporation, Farmington, CT (US)

(72) Inventors: Julian Winkler, Glastonbury, CT (US); Kenji Homma, Glastonbury, CT (US); Jeffrey L. Cipolla, Little Compton, RI (US)

(73) Assignee: Raytheon Company, Tewksbury, MA (US)

( * ) Notice: Subject to any disclaimer, the term of this patent is extended or adjusted under 35 U.S.C. 154(b) by 367 days.

(21) Appl. No.: 18/088,280

(22) Filed: Dec. 23, 2022

(65) Prior Publication Data

US 2024/0210354 A1    Jun. 27, 2024

(51) Int. Cl.
*G01N 29/02* (2006.01)
*G01N 29/24* (2006.01)

(52) U.S. Cl.
CPC ............. *G01N 29/02* (2013.01); *G01N 29/24* (2013.01); *G01N 2291/022* (2013.01); *G01N 2291/106* (2013.01)

(58) Field of Classification Search
CPC ................................ G01N 29/02; G01N 29/24
See application file for complete search history.

(56) References Cited

U.S. PATENT DOCUMENTS

| | | | |
|---|---|---|---|
| 4,223,397 A | 9/1980 | Bakewell, Jr. | |
| 4,817,757 A | 4/1989 | Perret | |
| 7,889,601 B2 | 2/2011 | Goodmote | |
| 7,896,126 B1 | 3/2011 | Haberman | |
| 8,689,935 B2 | 4/2014 | Wilson | |
| 9,410,403 B2 | 8/2016 | Wochner | |
| 9,488,026 B2 | 11/2016 | Wochner | |
| 9,607,601 B2 | 3/2017 | Wilson | |
| 9,812,112 B2 | 11/2017 | Wochner | |
| 2005/0109557 A1 | 5/2005 | Dravet | |

(Continued)

FOREIGN PATENT DOCUMENTS

| | | | | |
|---|---|---|---|---|
| CN | 111696502 A | * | 9/2020 | ........... B32B 15/043 |
| CN | 111696510 A | | 9/2020 | |

(Continued)

OTHER PUBLICATIONS

Machine translation of CN111696502 (Year: 2020).*
International search report for PCT/US23/85727 dated Mar. 6, 2024.

*Primary Examiner* — Walter L Lindsay, Jr.
*Assistant Examiner* — Andrew V Do
(74) *Attorney, Agent, or Firm* — Getz Balich LLC

(57) ABSTRACT

A resonator array panel includes a perforated first sheet, a second sheet, and a resonator core. The perforated first sheet includes a first sheet body. The second sheet includes a second sheet body. The second sheet body includes a second exterior side surface and a second interior side surface. The first resonator core is disposed between the perforated first sheet and the second sheet. The first resonator core includes a first plurality of sidewalls. The first plurality of sidewalls forms a first plurality of resonators between the perforated first sheet and the second sheet. The first plurality of resonators includes a first resonator. The first resonator includes a first viscoelastic body disposed within the first resonator cavity.

19 Claims, 6 Drawing Sheets

(56) References Cited

U.S. PATENT DOCUMENTS

2005/0194210 A1   9/2005   Panossian
2005/0241365 A1   11/2005  Palmer
2013/0142624 A1   6/2013   Julliard
2017/0053635 A1   2/2017   Leon
2019/0172438 A1   6/2019   Wadsworth
2020/0199866 A1   6/2020   Aten
2020/0217272 A1   7/2020   Gangloff, Jr.
2021/0210061 A1   7/2021   Su
2022/0186667 A1   6/2022   Riou
2022/0366886 A1   11/2022  Winkler

FOREIGN PATENT DOCUMENTS

CN   111739502 A   10/2020
CN   113002695 B   7/2022
CN   111696503 B   3/2023
EP      897176 A   2/1999

* cited by examiner

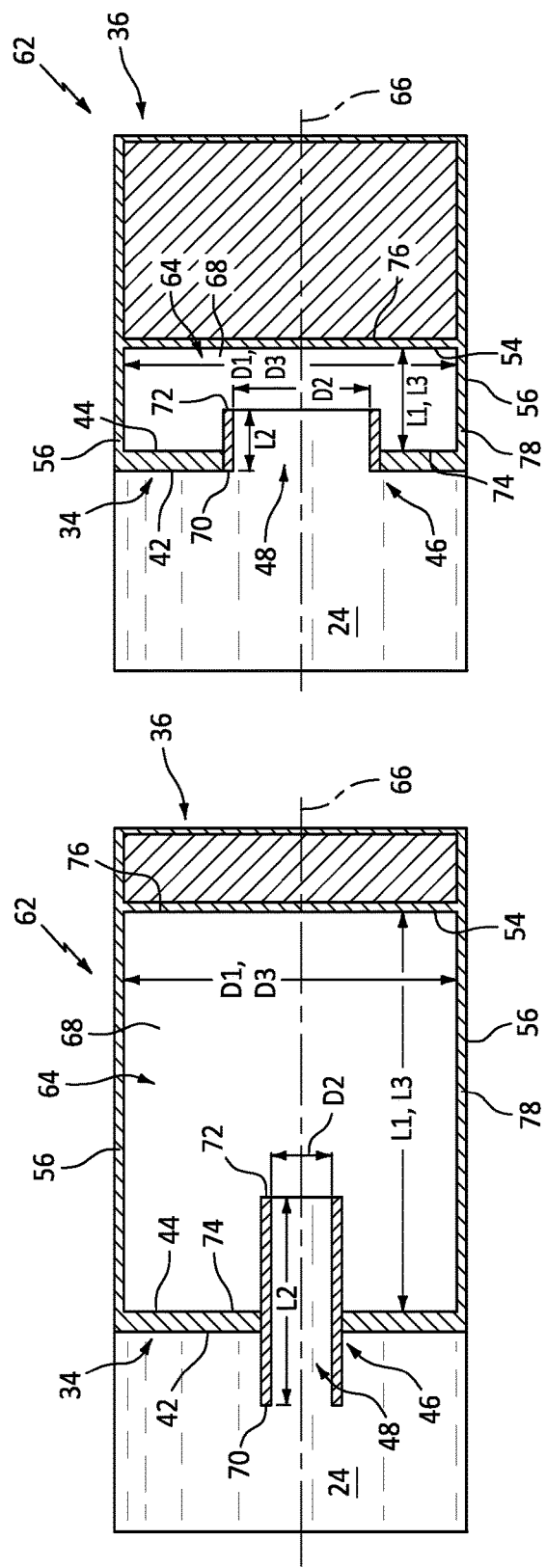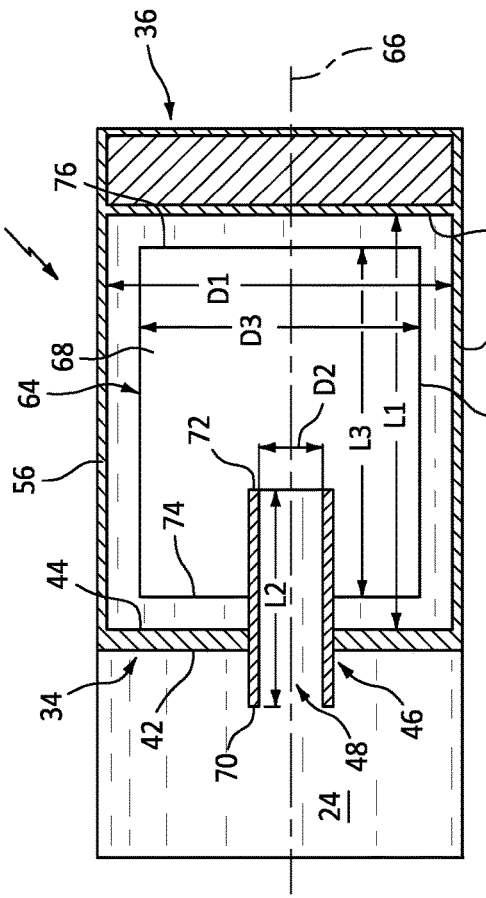
FIG. 3
FIG. 4
FIG. 5

RESONATOR ARRAY PANEL

BACKGROUND

1. Technical Field

The present disclosure relates to acoustic sensor test assemblies and, more particularly, resonator panels for test assembly liquid tanks.

2. Background Information

Sensors, such as acoustic sensors, may be developed and tested for liquid (e.g., water) environments using test assemblies including liquid tanks. These test assemblies may experience varying degrees of acoustic wave transmission and reflection during sensor testing. Various test assemblies are known in the art. While these known test assemblies have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a resonator array panel includes a perforated first sheet, a second sheet, and a resonator core. The perforated first sheet includes a first sheet body. The first sheet body includes a first exterior side surface and a first interior side surface. The first sheet body forms a first plurality of neck portions. Each neck portion of the first plurality of neck portions surrounds and forms a first aperture extending through the first sheet body at least from the first exterior side surface to the first interior side surface. The second sheet includes a second sheet body. The second sheet body includes a second exterior side surface and a second interior side surface. The first resonator core is disposed between the perforated first sheet and the second sheet. The first resonator core includes a first plurality of sidewalls. Each first sidewall extends from the first interior side surface and to the second interior side surface. The first plurality of sidewalls forms a first plurality of resonators between the perforated first sheet and the second sheet. The first plurality of resonators includes a first resonator. The first resonator forms a first resonator cavity along a resonator centerline. The first resonator cavity is in fluid communication with the first aperture of at least a first neck portion of the first plurality of neck portions. The first resonator includes a first viscoelastic body disposed within the first resonator cavity.

In any of the aspects or embodiments described above and herein, the first neck portion may extend from a first neck end to a second neck end. The second neck end may be disposed within the first resonator cavity and axially spaced from the first interior side surface.

In any of the aspects or embodiments described above and herein, the first neck end may be axially spaced from the first exterior side surface.

In any of the aspects or embodiments described above and herein, the first aperture formed by the first neck portion may have a first aperture volume, and all of the first aperture volume may be configured to be filled with a liquid.

In any of the aspects or embodiments described above and herein, the first viscoelastic body may include a syntactic foam.

In any of the aspects or embodiments described above and herein, the first resonator cavity may have a first cavity volume and the first viscoelastic body may have a first body volume, and the first cavity volume may be greater than the first body volume.

In any of the aspects or embodiments described above and herein, the first viscoelastic body may be moveable within the first resonator cavity.

In any of the aspects or embodiments described above and herein, the first plurality of resonators may include a second resonator. The second resonator may form a second resonator cavity. The second resonator cavity may be fluid communication with the first aperture of at least a second neck portion of the plurality of neck portions. The second resonator may include a second viscoelastic body disposed within the second resonator cavity. The second resonator may be different than the first resonator.

In any of the aspects or embodiments described above and herein, the first resonator cavity may have a first cavity volume and the second resonator cavity may have a second cavity volume, and the first cavity volume may be different than the second cavity volume.

In any of the aspects or embodiments described above and herein, the aperture formed by the first neck portion may have a first aperture volume and the aperture formed by the second neck portion may have a second aperture volume, and the first aperture volume may be different than the second aperture volume.

In any of the aspects or embodiments described above and herein, the first viscoelastic body may have a first body volume and the second viscoelastic body may have a second body volume, and the first body volume may be different than the second body volume.

In any of the aspects or embodiments described above and herein, the first resonator may be connected to a second adjacent resonator by at least one opening formed by a common sidewall of the first plurality of sidewalls.

In any of the aspects or embodiments described above and herein, the resonator array panel may further include a perforated third sheet and a second resonator core. The perforated third sheet may include a third sheet body. The third sheet body may include a third exterior side surface and a third interior side surface. The third sheet body may form a third plurality of neck portions. Each neck portion of the third plurality of neck portions may surround and form a third aperture extending through the third sheet body at least from the third exterior side surface to the third interior side surface. The second resonator core may be disposed between the perforated first sheet and the perforated third sheet. The second resonator core may include a second plurality of sidewalls. Each second sidewall may extend from the first exterior side surface to the third interior side surface. The second plurality of sidewalls may form a second plurality of resonators between the perforated first sheet and the perforated third sheet. The second plurality of resonators may include a second resonator. The second resonator may form a second resonator cavity along the resonator centerline. The second resonator cavity may be in fluid communication with the third aperture of at least a third neck portion of the third plurality of neck portions. The second resonator cavity may further be in fluid communication with the first resonator cavity. The second resonator may include a second viscoelastic body disposed within the second resonator cavity.

In any of the aspects or embodiments described above and herein, each resonator of the second plurality of resonators may have a same configuration as each other resonator of the second plurality of resonators.

In any of the aspects or embodiments described above and herein, the first resonator and the second resonator are configured to allow a liquid to flow from an exterior of the resonator array panel, through the second resonator cavity, and into the first resonator cavity.

According to another aspect of the present disclosure, a test assembly includes a tank, an acoustic sensor, and at least one resonator array panel. The tank includes one or more tank walls. The one or more tank walls are configured for storing a liquid within the tank. The acoustic sensor is disposed within the tank. The acoustic sensor is configured to record an acoustic signal propagating through the liquid. The at least one resonator array panel is disposed on the one or more tank walls. The at least one resonator array panel includes a perforated first sheet, a second sheet, and a resonator core. The perforated first sheet includes a first sheet body. The first sheet body includes a first exterior side surface and a first interior side surface. The first sheet body forms a plurality of neck portions. Each neck portion of the plurality of neck portions surrounds and forms an aperture extending through the first sheet body at least from the first exterior side surface to the first interior side surface. The second sheet includes a second sheet body. The second sheet body includes a second exterior side surface and a second interior side surface. The resonator core is disposed between the perforated first sheet and the second sheet. The resonator core includes a plurality of sidewalls. Each sidewall extends from the first interior side surface to the second interior side surface. The plurality of sidewalls forms a plurality of resonators between the perforated first sheet and the second sheet. Each resonator forms a resonator cavity in fluid communication with the aperture of at least one neck portion of the plurality of neck portions. Each resonator includes a filler material body disposed within the respective resonator cavity.

In any of the aspects or embodiments described above and herein, the aperture formed by each neck portion may have an aperture volume, and all of the aperture volume may be configured to be filled with the liquid.

In any of the aspects or embodiments described above and herein, each resonator of the plurality of resonators may be different than each other resonator of the plurality of resonators.

According to another aspect of the present disclosure, a resonator array panel includes a plurality of stacked resonator array panel stages. Each resonator array panel stage includes a perforated sheet and a resonator core. The perforated sheet includes a sheet body. The sheet body includes an exterior side surface and an interior side surface. The sheet body forms a plurality of neck portions. Each neck portion of the plurality of neck portions surrounds and forms an aperture extending through the sheet body at least from the exterior side surface to the interior side surface. The resonator core is disposed at the perforated sheet. The resonator core includes a plurality of sidewalls. Each sidewall contacts the interior side surface. The plurality of sidewalls forms a plurality of resonators. Each resonator forms a resonator cavity. Each resonator cavity is in fluid communication with the aperture of at least one neck portion of the plurality of neck portions. The plurality of stacked resonator array panel stages includes a first resonator array panel stage and a second resonator array panel stage. The plurality of resonators of the first resonator array panel stage includes a first resonator. The plurality of resonators of the second resonator array panel stage includes a second resonator. The first resonator and the second resonator are disposed about a common resonator centerline. The first resonator is connected in fluid communication with the second resonator. Each of the first resonator and the second resonator include a filler material body.

In any of the aspects or embodiments described above and herein, the filler material body of the first resonator may be different than the filler material body of the second resonator.

The present disclosure, and all its aspects, embodiments and advantages associated therewith will become more readily apparent in view of the detailed description provided below, including the accompanying drawings.

BRIEF DESCRIPTION OF THE DRAWINGS

FIG. 3 illustrates a side, cutaway view of a resonator, in accordance with one or more embodiments of the present disclosure.

FIG. 4 illustrates a side, cutaway view of another resonator, in accordance with one or more embodiments of the present disclosure.

FIG. 5 illustrates a side, cutaway view of another resonator, in accordance with one or more embodiments of the present disclosure.

DETAILED DESCRIPTION

The present disclosure is directed to a resonator array panel, and a test assembly including at least one of the present disclosure resonator array panels. The present disclosure provides particular utility when implemented with a test assembly for the testing and development of underwater acoustic sensors or other acoustic equipment. However, the present disclosure resonator array panel is not limited to any particular application.

Acoustic testing of sensors or other equipment in fluid (e.g., water or another liquid) tanks may, in at least some cases, be limited by acoustic wave reflections from tank walls. For relatively high-frequency acoustic signals, a sufficient number of wave cycles for an acoustic signal may be recorded by acoustic sensors before reflection of the acoustic signal begins to occur. However, for relatively low-frequency acoustic signals, the number of wave cycles recorded for the acoustic signal may be insufficient to satisfy testing requirements for the sensors or other equipment.

Figure 1:
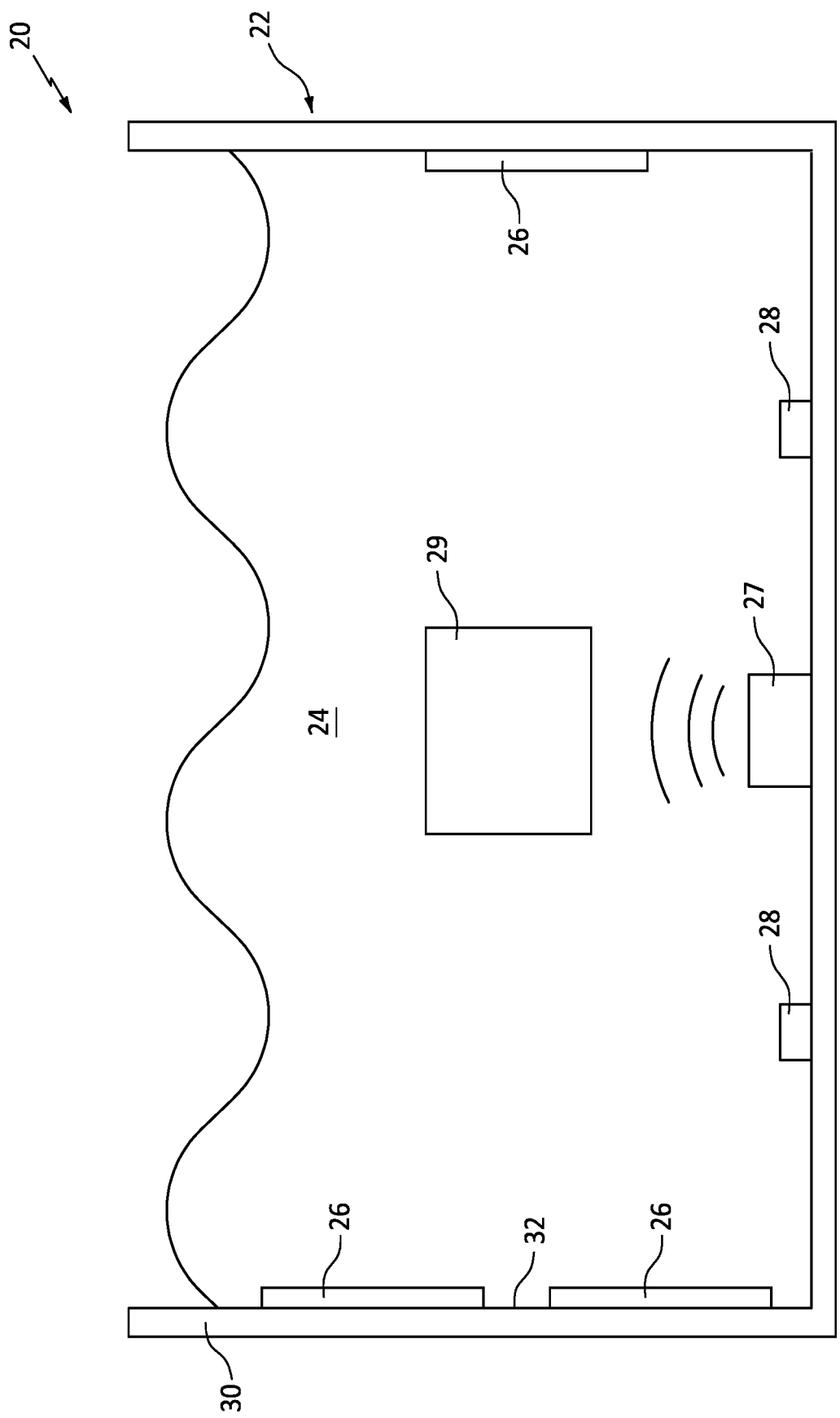
FIG. 1 illustrates a diagrammatic view of a test assembly including at least one resonator array panel, in accordance with one or more embodiments of the present disclosure.

FIG. 1 diagrammatically illustrates an exemplary test assembly 20. The test assembly 20 of FIG. 1 includes a fluid tank 22 storing a fluid 24 (e.g., water or another liquid) and a plurality of resonator array panels 26. The test assembly 20 may further include an acoustic source 27, one or more sensors 28, and/or a target 29. The present disclosure, however, is not limited to any particular configuration for the test assembly 20 or to the particular positions of the test assembly 20 components illustrated in FIG. 1. The fluid tank 22 includes one or more tank walls 30. The tank walls 30 form one or more interior surfaces 32 of the fluid tank 22, which interior surfaces 32 bound the fluid 24 stored within the fluid tank 22. The resonator array panels 26 of FIG. 1 are disposed at (e.g., on, adjacent, or proximate) the interior surfaces 32. For example, the resonator array panels 26 may be mounted to the interior surfaces 32 using a suitable attachment configuration (e.g., mechanical fasteners, adhesive, etc.). The test assembly 20 of FIG. 1 includes three resonator array panels 26, however, the test assembly 20 may alternatively include more or fewer resonator array panels 26. The acoustic source 27 may be configured as an acoustic transmitter to generate an acoustic signal for transmission through the fluid 24. Alternatively, the acoustic source 27 may be an assembly, a component, or other object which may incidentally produce an acoustic signal. The sensor 28 may be an acoustic sensor. The sensor 28 may be configured, for example, as a transducer for recording the acoustic signal propagating through the fluid 24 by converting acoustic wave vibrations into an electrical signal. For example, the sensor 28 may record an acoustic signal generated or otherwise produced by the acoustic source 27. During some testing processes, the target 29 may be positioned within the fluid tank 22. The target 29 may be a component or other object which is the subject of acoustic testing with the test assembly 20. For example, the acoustic source 27 may generate an acoustic signal which may be reflected and/or absorbed by the target 29. The sensor 28 may record the acoustic signal propagating through the fluid 24 to identify acoustic characteristics (e.g., acoustic reflection, acoustic absorption, etc.) of the target 29.

Figure 2:
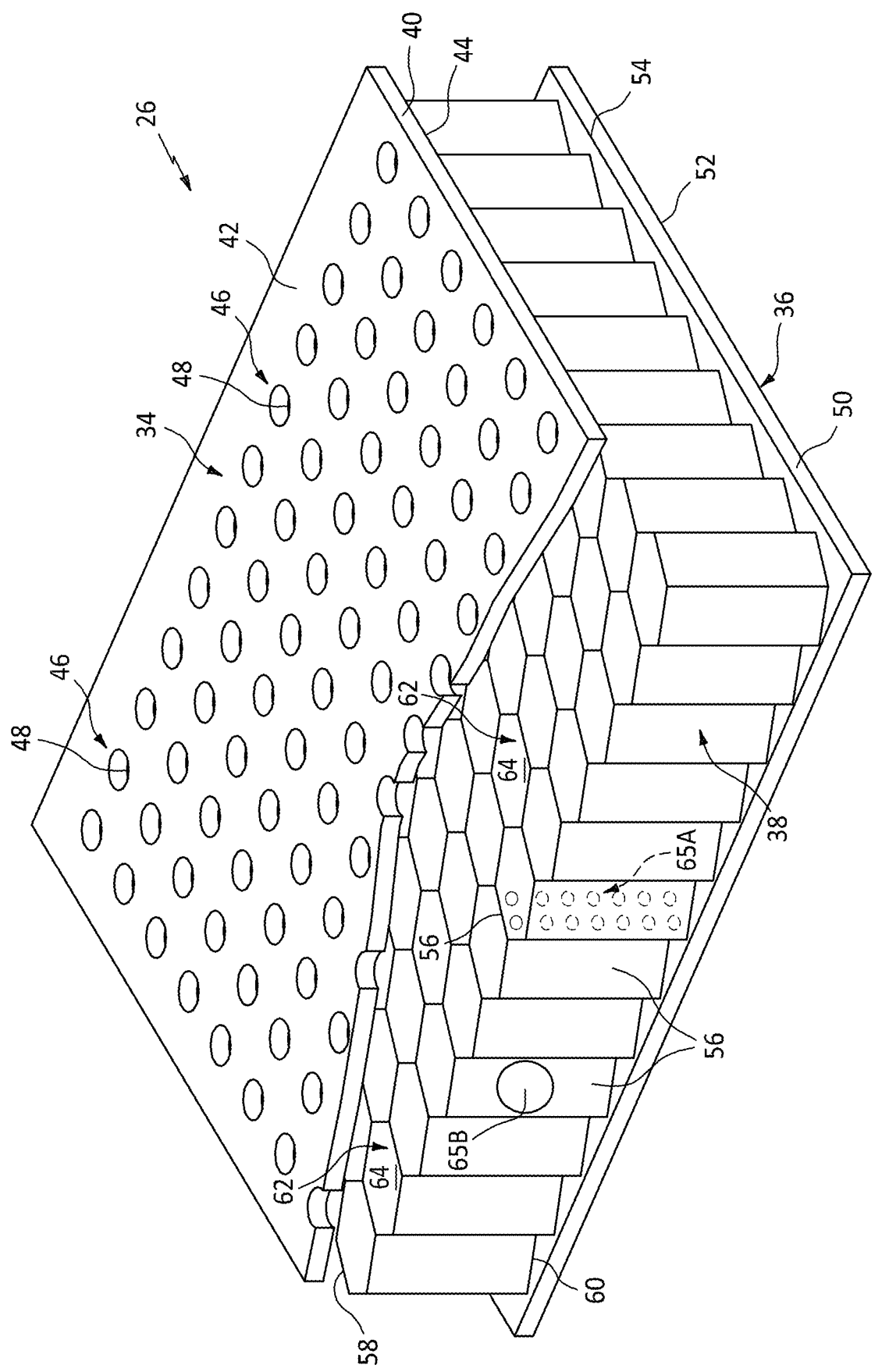
FIG. 2 illustrates a perspective, cutaway view of a resonator array panel, in accordance with one or more embodiments of the present disclosure.

FIG. 2 illustrates a perspective, cutaway view of an embodiment of the resonator array panel 26. The resonator array panel 26 of FIG. 2 includes a perforated first sheet 34, a second sheet 36, and a resonator core 38.

The first sheet 34 includes a sheet body 40. The sheet body 40 includes an exterior side surface 42 and an interior side surface 44 disposed opposite the exterior side surface 42. As will be described in further detail, the sheet body 40 includes a plurality of neck portions 46. Each neck portion 46 forms an aperture 48 extending through the sheet body 40. For example, each aperture 48 extends through the sheet body 40 and at least from the exterior side surface 42 to the interior side surface 44.

The second sheet 36 includes a sheet body 50. The sheet body 50 includes an exterior side surface 52 and an interior side surface 54 disposed opposite the exterior side surface 52. The second sheet 36 may be imperforate, however, the present disclosure is not limited to an imperforate configuration of the second sheet 36.

The resonator core 38 includes a plurality of sidewalls 56. The plurality of sidewalls 56 extend from a first sidewall end 58 of the plurality of sidewalls 56 to a second sidewall end 60 of the plurality of sidewalls 56. The plurality of sidewalls 56 extend from the first sheet 34 and to the second sheet 36. The first sidewall end 58 is disposed at (e.g., on, adjacent, or proximate) the first sheet 34 (e.g., the interior side surface 44). For example, the first sidewall end 58 may be fixedly attached to the interior side surface 44. The second sidewall end 60 is disposed at (e.g., on, adjacent, or proximate) the second sheet 36 (e.g., the interior side surface 54). For example, the second sidewall end 60 may be fixedly attached to the interior side surface 54.

The plurality of sidewalls 56 form a plurality of distinct resonators 62 between the first sheet 34 and the second sheet 36. Each resonator 62 forms a resonator cavity 64. Each resonator cavity 64 is further formed by the interior side surface 44 and the interior side surface 54. Each resonator cavity 64 is in fluid communication (e.g., directly fluidly coupled) with the aperture 48 of at least one neck portion 46. The resonators 62 of FIG. 2 are illustrated as having a substantially hexagonal cross-sectional shape, however, the present disclosure is not limited to any particular shape for the resonators 62. For example, the resonators 62 may alternatively be configured with cross-sectional shapes including, but not limited to, a circle, or a quadrilateral (e.g., square). In some embodiments, one or more resonators 62 may be connected in fluid communication with one or more adjacent resonators 62, for example, by perforations or other openings formed through the sidewall 56 (e.g., a common sidewall shared by adjacent resonators) between adjacent resonator cavities 64. FIG. 2 illustrates first exemplary sidewall perforations 65A and a second exemplary sidewall perforation 65B for connecting adjacent resonator cavities 64 in fluid communication. For the resonator array panel 26 of FIG. 2, each resonator cavity 64 may be understood to be in fluid communication with one respective aperture 48. However, the present disclosure is not limited to this particular configuration, and each resonator cavity 64 may be in fluid communication with a plurality of apertures 48 formed by a respective plurality of neck portions 46. Moreover, the apertures 48 formed by the sheet body 40 (e.g., the neck portions 46) are not limited to any particular size, shape, or density (e.g., apertures 48 for a given sheet body 40 area). The configuration of the resonators 62 effects absorption and/or attenuation of acoustic wave energy in proximity to the resonator array panel 26, thereby mitigating the impact of acoustic wave reflections from the tank walls 30 (see FIG. 1) during testing and/or development of sensors (e.g., the sensor 28).

The first sheet 34, the second sheet 36, and the resonator core 38 may be formed by lightweight and/or inexpensive materials which are sufficiently rigid and suitable for extended exposure, for example, to the fluid 24 environment for the test assembly 20 (see FIG. 1). Examples of a suitable material for the first sheet 34, the second sheet 36, and/or the resonator core 38 may include a plastic material such as, but not limited to a thermoplastic polymer material (e.g., acrylonitrile butadiene styrene (ABS), polyphenylene sulfide (PPS), polyetherimide (PEI), polyether ether ketone (PEEK), polyetherketoneketone (PEKK), polyaryletherketone (PAEK), etc.), or a fiber-reinforced thermoplastic matrix composite material. The first sheet 34, the second sheet 36, and/or the resonator core 38 may be manufactured together (e.g., as a single integral unit) or separately manufactured and subsequently assembled together (e.g., using an adhesive, thermoplastic curing or co-curing technique, mechanical fasteners, etc.). The first sheet 34, the second sheet 36, and/or the resonator core 38 may be manufactured, for example, using an injection molding or an additive manufacturing (e.g., 3D printing) process. The present disclosure, however, is not limited to any particular material, combination of materials, or manufacturing process for the components of the resonator array panel 26 including the first sheet 34, the second sheet 36, and the resonator core 38. The first sheet 34 and the second sheet 36 of FIG. 2 are illustrated as having a substantially flat (e.g., planar) orientation, however, the components of the resonator array panel 26 may alternatively have a curved, angled, or otherwise non-planar configuration to accommodate a shape of the particular tank wall(s) 30 (see FIG. 1) on which the resonator array panel 26 may be disposed.

FIGS. 3-5 illustrate side, cutaway views of different resonator 62 embodiments. The resonators 62 of FIGS. 3-5 are disposed about a resonator centerline 66. The resonator cavity 64 has a cavity length L1 and a cavity diameter D1. The cavity length L1 extends (e.g., axially extends) from the interior side surface 44 to the interior side surface 54 which form the resonator cavity 64. The cavity diameter D1 extends (e.g., radially extends) between opposing sidewalls 56 or opposing portions of the sidewalls 56 which form the resonator cavity 64. The resonator cavity 64 should be understood to have a cavity volume formed by and within the first sheet 34 (e.g., the interior side surface 44), the second sheet 36 (e.g., the interior side surface 54), and the sidewalls 56 for the respective resonator 62. Each resonator 62 may be understood to include the neck portion(s) 46 which is (are) disposed coincident with the particular resonator 62. Each resonator 62 may additionally include a filler material body 68 disposed within the resonator cavity 64 as shown, for example, in FIGS. 3-5. The resonators 62 of the present disclosure, however, are not limited to the inclusion of the filler material body 68.

As shown in FIGS. 3-5, the neck portion 46 extends (e.g., axially extends) from a first neck end 70 of the neck portion 46 to a second neck end 72 of the neck portion 46. The first neck end 70 may be disposed at (e.g., on, adjacent, or proximate) the exterior side surface 42 as shown, for example, in FIG. 4. Alternatively, the first neck end 70 may be disposed outward (e.g., axially outward) from the exterior side surface 42 as shown, for example, in FIGS. 3 and 5. In other words, the first neck end 70 may be axially spaced from the exterior side surface 42. The second neck end 72 may be disposed at (e.g., on, adjacent, or proximate) the interior side surface 44 as shown (see, e.g., FIG. 6). Alternatively, the second neck end 72 may be disposed inward (e.g., axially inward) from the interior side surface 44 as shown, for example, in FIGS. 3-5. In other words, the second neck end 72 may be axially spaced from the interior side surface 44. The neck portion 46 has a neck length L2 extending (e.g., axially extending) from the first neck end 70 to the second neck end 72. The neck portion 46 has a neck diameter D2 extending (e.g., radially extending) between and to-opposing portions of the neck portion 46. The neck length L2 and the neck diameter D2 may define an aperture volume for the aperture 48 formed by the neck portion 46. The aperture 48 is configured to be filled a fluid (e.g., water or another liquid). For example, the resonator 62 is configured to allow the aperture volume (e.g., the entire aperture volume) of the aperture 48 to be filled with the fluid 24 (e.g., water or another liquid) of the test assembly 20 (see FIG. 1) and to allow the fluid 24 to flow into and through the aperture 48 from an exterior of the resonator 62.

The filler material body 68 may be disposed within the resonator cavity 64 to tailor the acoustic absorption and/or acoustic attenuation properties of the resonator 62 for a particular acoustic frequency or a particular range of acoustic frequencies. The filler material body 68 includes a first end 74, a second end 76, and an exterior side 78. The exterior side 78 extends from the first end 74 to the second end 76. The filler material body 68 has a body length L3, a body diameter D3, and a body volume. The body length L3 extends (e.g., axially extends) from the first end 74 to the second end 76. The body diameter D3 extends (e.g., radially extends) between opposing portions of the exterior side 78. The body volume of the filler material body 68 may be the same as or substantially the same as the cavity volume of the resonator cavity 64 as shown, for example, in FIGS. 3 and 4. In other words, the filler material body 68 may fill (e.g., completely fill) the resonator cavity 64 and may contact the interior side surface, the interior side surface, and the sidewalls 56. The filler material body 68 may, therefore, be fixed or substantially fixed relative to the first sheet 34, the second sheet 36, and or the sidewalls 56. As can be seen in FIGS. 3-5, the filler material body 68 may generally be absent (e.g., not disposed) within the aperture 48, to allow a fluid (e.g., the fluid 24) to fill the aperture 48. The body volume of the filler material body 68 may alternatively be less than the cavity volume of the resonator cavity 64 as shown, for example, in FIG. 5. For example, the body length L3 may be less than the cavity length L1. For further example, the body diameter D3 may additionally or alternatively be less than the cavity diameter D1. The filler material body 68 may be loosely fitted within the resonator cavity 64 such that the filler material body 68 is moveable within the resonator cavity 64. This configuration of the filler material body 68 may allow the fluid 24 to be present and flow between the filler material body 68 and the interior side surface 44, the interior side surface 54, and/or the sidewalls 56.

The filler material body 68 includes a body material. The body material may form all or a substantial portion of the filler material body 68. Examples of the body material include, but are not limited to, viscoelastic materials such as rubber or syntactic foam. A syntactic foam body material may include a composite material formed by filling a syntactic foam matrix, such as a metal, a polymer, epoxy resin, or ceramic matrix material, with a plurality of hollow spheres (e.g., "microballoons") or cenospheres. The microballoons may be formed from glass, polymers, ceramic materials, or any other lightweight material suitable for attenuating acoustic waves. The body material may be permeable or impermeable with respect to the fluid 24. The present disclosure is not limited to any particular material or combination of materials for the body material, provided the body material can be used for further tailoring the acoustic absorption and/or acoustic attenuation properties of the resonator 62 for a particular acoustic frequency or a particular range of acoustic frequencies.

Tuning of the resonator 62 for absorption and/or attenuation of a particular acoustic frequency or a particular range of acoustic frequencies may be accomplished based on a selected configuration of one or more features of the resonator 62 such as, but not limited to, neck portion 46 size (e.g., neck length L2, neck diameter D2 or sum of neck diameters D2), cavity volume of the resonator cavity 64, filler material body 68 material selection, fluid connection of the resonator 62 to adjacent resonators 62 through the sidewalls 56, and/or body volume of the filler material body 68 (e.g., a ratio of the body volume to the cavity volume of the resonator cavity 64). Routine experimentation may be performed by a person of ordinary skill in the art to tailor the attenuation and/or absorption characteristics of a resonator in accordance with and as informed by one or more aspects of the present disclosure. Comparing the exemplary resonators 62 of FIGS. 3 and 4, for example, the resonator 62 of FIG. 4 has a shorter neck length L2, a larger neck diameter D2, and a smaller cavity volume in comparison to the resonator 62 of FIG. 3. The resonator 62 configuration of FIG. 4 may be preferrable for absorption and/or attenuation of relatively higher acoustic wave frequencies in comparison to the resonator 62 configuration of FIG. 3, which may be preferrable for absorption and/or attenuation of relatively lower acoustic wave frequencies.

Figure 6:
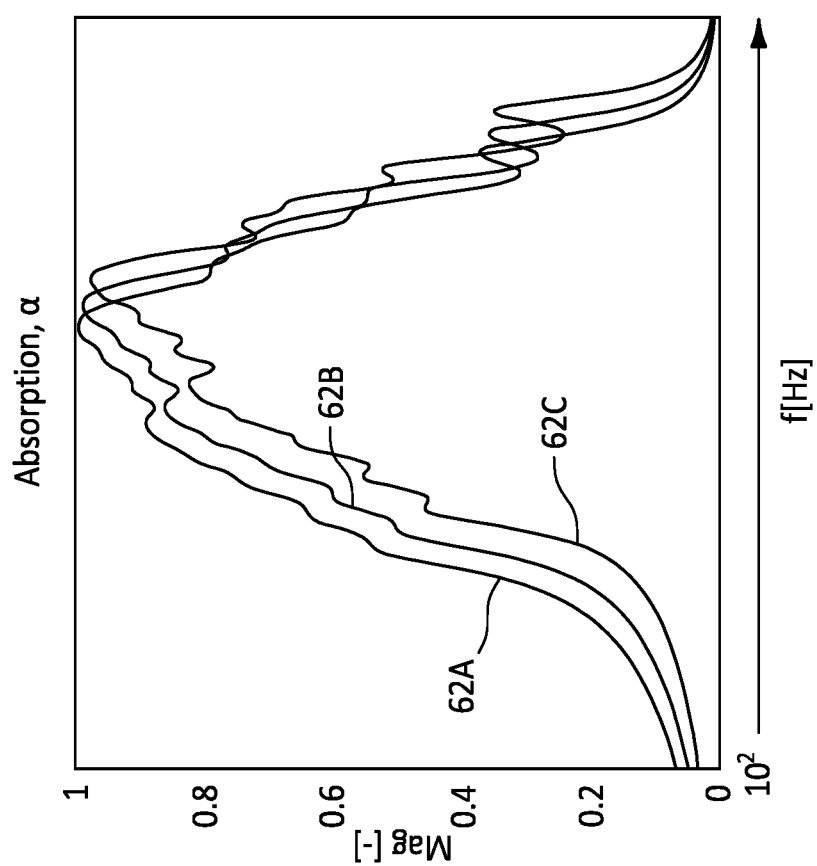
FIG. 6 graphically illustrates acoustic wave absorption characteristics for different resonator configurations, in accordance with one or more embodiments of the present disclosure.

As previously discussed, the body volume of the filler material body 68 may also be selected to tailor the associated resonator 62 for frequency range of acoustic absorption. FIG. 6 graphically illustrates acoustic wavelength absorption characteristics which are representative of three different exemplary resonators 62 including a first resonator 62A, a second resonator 62B, and a third resonator 62C used in a test assembly with a syntactic foam as the body material and water as the test assembly fluid. The first resonator 62A has a ratio of the body volume of the filler material body 68 to the cavity volume of the resonator cavity 64 (hereinafter "body ratio $X_{SF}$") of approximately 1.00. The second resonator 62B has a body ratio $X_{SF}$ of approximately 0.75. The third resonator 62C has a body ratio $X_{SF}$ of approximately 0.50. As the body ratio $X_{SF}$ for a resonator 62 decreases (e.g., from a body ratio $X_{SF}$ of approximately 1.00), the resonator 62 exhibits a shift in absorption frequency range to higher frequencies.

Figure 7:
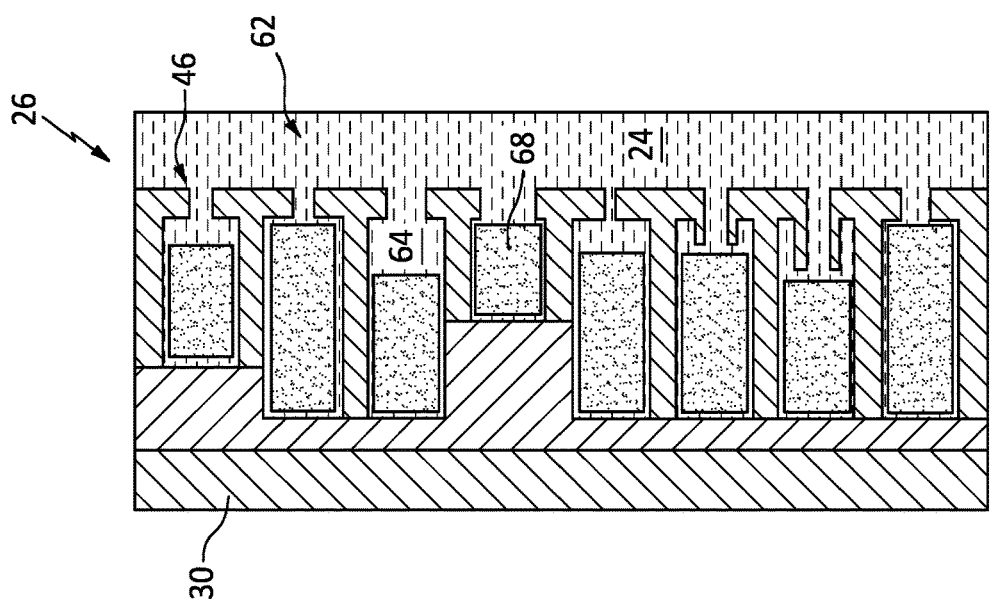
FIG. 7 illustrates a side, cutaway view of another resonator array panel, in accordance with one or more embodiments of the present disclosure.

FIG. 7 illustrates a side, cutaway view of an embodiment of the resonator array panel 26 disposed at (e.g., on, adjacent, or proximate) the tank wall 30. The resonator array panel 26 of FIG. 7 includes a plurality of different resonators 62. Each resonator 62 may be different than one or more other resonators 62 of the plurality of different resonators 62, for example, as to neck portion 46 size (e.g., neck length L2, neck diameter D2, see FIGS. 3-5), cavity volume of the resonator cavity 64, filler material body 68 material selection, and/or body volume of the filler material body 68 (e.g., body ratio $X_{SF}$) (see FIGS. 3-5). The use of the plurality of different resonators 62 in the resonator array panel 26 may facilitate absorption and/or attenuation of acoustic wave energy over a broad range of targeted frequencies.

Figure 8:
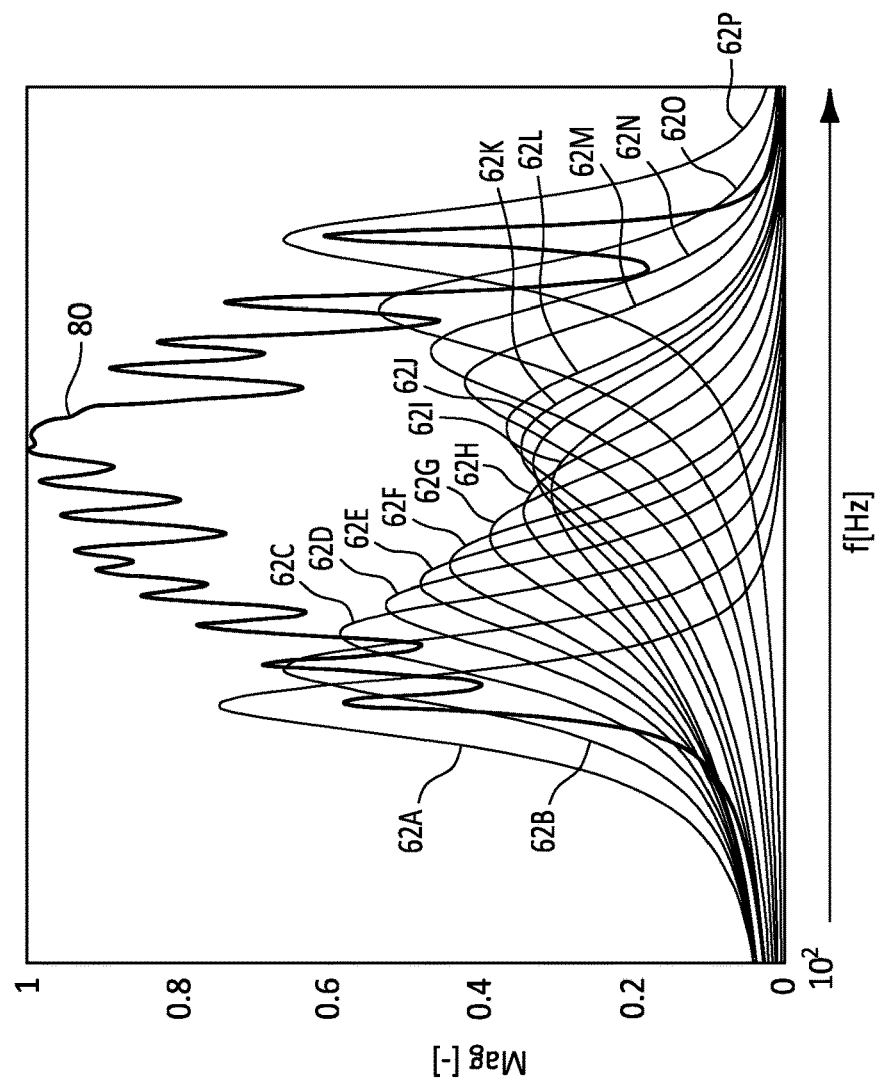
FIG. 8 graphically illustrates acoustic wave absorption characteristics for resonators of a resonator array panel, in accordance with one or more embodiments of the present disclosure.

As an example, FIG. 8 graphically illustrates acoustic absorption characteristics which are representative of an exemplary resonator array panel 26 including 16 resonators 62 (resonators 62A-P). FIG. 8 illustrates the relative absorption magnitudes for the resonators 62A-P over an acoustic wave frequency range. FIG. 8 further illustrates the combined absorption characteristics 80 for the entire resonator array panel 26.

Figure 9:
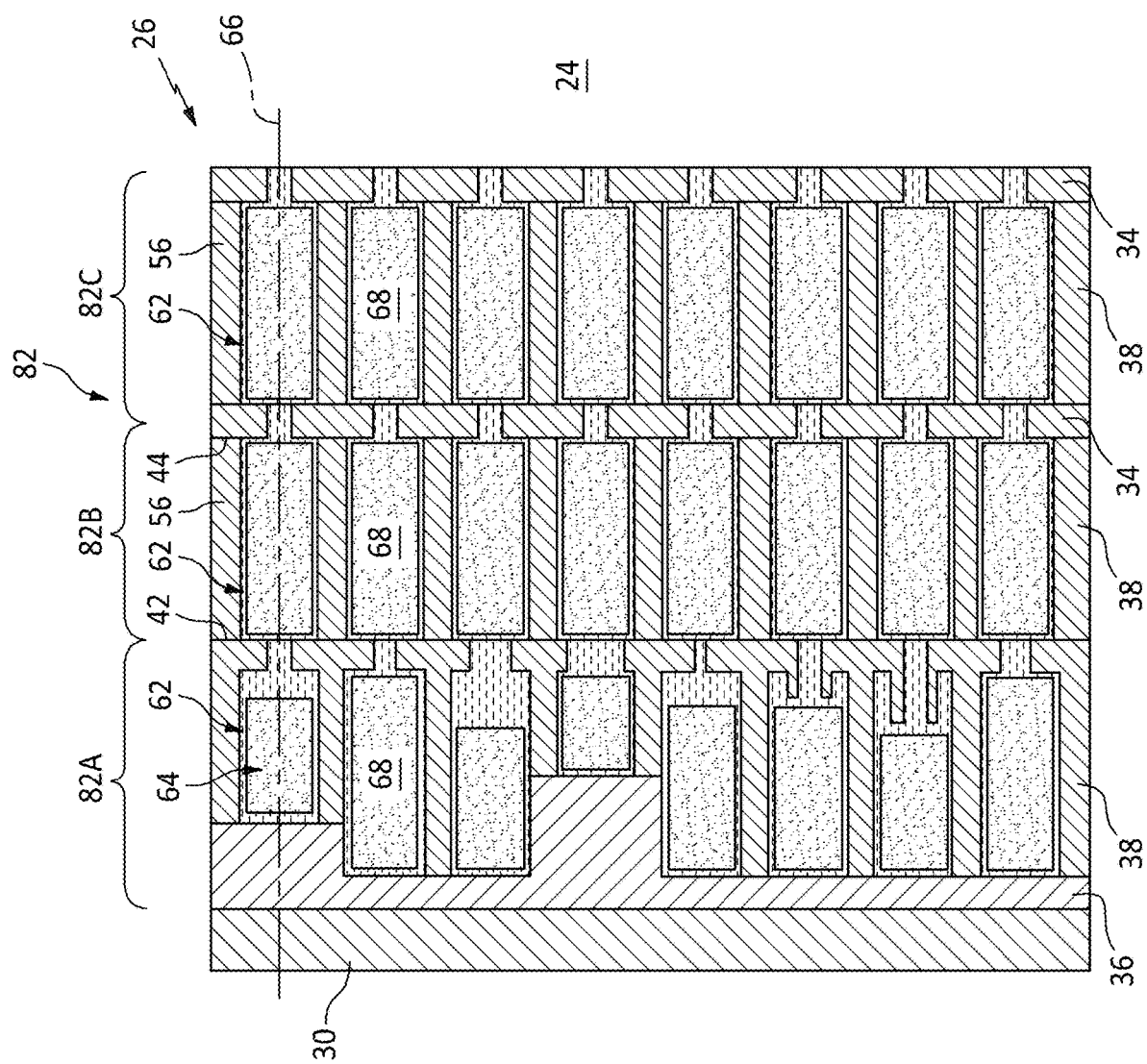
FIG. 9 illustrates a side, cutaway view of another resonator array panel, in accordance with one or more embodiments of the present disclosure.

FIG. 9 illustrates a side, cutaway view of another embodiment of the resonator array panel 26 disposed at (e.g., on, adjacent, or proximate) the tank wall 30. The resonator array panel 26 of FIG. 9 includes a plurality of stacked resonator array stages 82 including a first resonator array stage 82A, a second resonator array stage 82B, and a third resonator array stage 82C. The present disclosure, however, is not limited to any particular number of resonator array stages. The first resonator array stage 82A may be configured similar to embodiments of the resonator array panel 26 described above and may include the perforated first sheet 34, the second sheet 36, and the resonator core 38. Subsequent resonator array stages 82, such as the second resonator array stage 82B and the third resonator array stage 82C may each include another of the perforated first sheet 34 and another of the resonator core 38.

For example, the resonator core 38 of the second resonator array stage 82B connects and is disposed between the resonator core 38 of the first resonator array stage 82A and the first sheet 34 (e.g., the interior side surface 44) of the second resonator array stage 82B. The plurality of sidewalls 56 of the resonator core 38 of the second resonator array stage 82B form the plurality of resonators 62 for the second resonator array stage 82B. Each resonator 62 of the second resonator array stage 82B may be connected in fluid communication with a respective resonator 62 of the first resonator array stage 82A. One or more of the resonators 62 of the second resonator array stage 82B may each include the filler material body 68, which filler material body 68 may be configured to allow the fluid 24 to flow into and out of the respective resonator 62 of the first resonator array stage 82A. For example, a first resonator 62 of the first resonator array stage 82A and a second resonator 62 of the second resonator array stage 82B may be disposed about a common resonator centerline 66. The first resonator 62 may be different than the second resonator 62, for example, as to neck portion 46 size (e.g., neck length L2, neck diameter D2, see FIGS. 3-5), cavity volume of the resonator cavity 64, filler material body 68 material selection, and/or body volume of the filler material body 68 (e.g., body ratio $X_{SF}$) (see FIGS. 3-5). Alternatively, the first resonator 62 and the second resonator 62 may be identical or substantially identical. As shown in FIG. 9, each resonator 62 of the second resonator array stage 82B may be identical or substantially identical (e.g., having a same configuration) to each other resonator 62 of the second resonator array stage 82B. Alternatively, one or more resonators 62 of the second resonator array stage 82B may be different than one or more other resonators 62 of the second resonator array stage 82B. The description of the second resonator array stage 82B may also be applicable to subsequent resonator array stages such as, but not limited to, the third resonator array stage 82C.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A resonator array panel comprising:
a perforated first sheet including a first sheet body, the first sheet body including a first exterior side surface and a first interior side surface, the first sheet body forming a first plurality of neck portions, each neck portion of the first plurality of neck portions surrounding and forming a first aperture extending through the first sheet body at least from the first exterior side surface to the first interior side surface;
a second sheet including a second sheet body, the second sheet body including a second exterior side surface and a second interior side surface; and
a first resonator core disposed between the perforated first sheet and the second sheet, the first resonator core including a first plurality of sidewalls, each first sidewall extending from the first interior side surface to the second interior side surface, the first plurality of sidewalls forming a first plurality of resonators between the perforated first sheet and the second sheet, the first plurality of resonators including a first resonator, the first resonator forming a first resonator cavity along a resonator centerline, the first resonator cavity in fluid communication with the first aperture of at least a first neck portion of the first plurality of neck portions, the first resonator including a first viscoelastic body disposed within the first resonator cavity,
wherein the first neck portion extends from a first neck end to a second neck end in an axial direction along the resonator centerline, the second neck end disposed within the first resonator cavity and axially spaced from the first interior side surface.

2. The resonator array panel of claim 1, the first neck end is axially spaced from the first exterior side surface.

3. The resonator array panel of claim 1, wherein the first aperture formed by the first neck portion has a first aperture volume, and all of the first aperture volume is configured to be filled with a liquid.

4. The resonator array panel of claim 1, wherein the first viscoelastic body includes a syntactic foam.

5. The resonator array panel of claim 1, wherein the first resonator cavity has a first cavity volume and the first viscoelastic body has a first body volume, and the first cavity volume is greater than the first body volume.

6. The resonator array panel of claim 5, wherein the first viscoelastic body is moveable within the first resonator cavity.

7. The resonator array panel of claim 1, wherein:
the first plurality of resonators includes a second resonator, the second resonator forming a second resonator cavity, the second resonator cavity in fluid communication with a second aperture of at least a second neck portion of the first plurality of neck portions, the second resonator including a second viscoelastic body disposed within the second resonator cavity; and
the second resonator is different than the first resonator.

8. The resonator array panel of claim 7, wherein the first resonator cavity has a first cavity volume and the second resonator cavity has a second cavity volume, and the first cavity volume is different than the second cavity volume.

9. The resonator array panel of claim 7, wherein the first aperture formed by the first neck portion has a first aperture volume and the second aperture formed by the second neck portion has a second aperture volume, and the first aperture volume is different than the second aperture volume.

10. The resonator array panel of claim 7, wherein the first viscoelastic body has a first body volume and the second viscoelastic body has a second body volume, and the first body volume is different than the second body volume.

11. The resonator array panel of claim 1, wherein the first resonator is connected in fluid communication with a second adjacent resonator by at least one opening formed by a common sidewall of the first plurality of sidewalls.

12. The resonator array panel of claim 1, further comprising:
a perforated third sheet including a third sheet body, the third sheet body including a third exterior side surface and a third interior side surface, the third sheet body forming a third plurality of neck portions, each neck portion of the third plurality of neck portions surrounding and forming a third aperture extending through the third sheet body at least from the third exterior side surface to the third interior side surface; and
a second resonator core disposed between the perforated first sheet and the perforated third sheet, the second resonator core including a second plurality of sidewalls, each second sidewall extending from the first exterior side surface to the third interior side surface, the second plurality of sidewalls forming a second plurality of resonators between the perforated first sheet and the perforated third sheet, the second plurality of resonators including a second resonator, the second resonator forming a second resonator cavity along the resonator centerline, the second resonator cavity in fluid communication with the third aperture of at least a third neck portion of the third plurality of neck portions, the second resonator cavity further in fluid communication with the first resonator cavity, the second resonator including a second viscoelastic body disposed within the second resonator cavity.

13. The resonator array panel of claim 12, wherein each resonator of the second plurality of resonators has a same configuration as each other resonator of the second plurality of resonators.

14. The resonator array panel of claim 12, wherein the first resonator and the second resonator are configured to allow a liquid to flow from an exterior of the resonator array panel, through the second resonator cavity, and into the first resonator cavity.

15. A test assembly comprising:
a tank including one or more tank walls, the one or more tank walls configured for storing a liquid within the tank;
an acoustic sensor disposed within the tank, the acoustic sensor configured to record an acoustic signal propagating through the liquid; and
at least one resonator array panel disposed on the one or more tank walls, the at least one resonator array panel including:
a perforated first sheet including a first sheet body, the first sheet body including a first exterior side surface and a first interior side surface, the first sheet body forming a plurality of neck portions, each neck portion of the plurality of neck portions surrounding and forming an aperture extending through the first sheet body at least from the first exterior side surface to the first interior side surface;
a second sheet including a second sheet body, the second sheet body including a second exterior side surface and a second interior side surface; and
a resonator core disposed between the perforated first sheet and the second sheet, the resonator core including a plurality of sidewalls, each sidewall extending from the first interior side surface and to the second interior side surface, the plurality of sidewalls forming a plurality of resonators between the perforated first sheet and the second sheet, each resonator forming a resonator cavity in fluid communication with the aperture of at least one neck portion of the plurality of neck portions, each resonator including a filler material body disposed within the respective resonator cavity,
wherein the at least one neck portion extends from a first neck end to a second neck end in an axial direction along a resonator centerline, the second neck end disposed within the resonator cavity and axially spaced from the first interior side surface.

16. The test assembly of claim 15, wherein the aperture formed by each neck portion has an aperture volume, and all of the aperture volume is configured to be filled with the liquid.

17. The test assembly of claim 15, wherein each resonator of the plurality of resonators is different than each other resonator of the plurality of resonators.

18. A resonator array panel comprising:
plurality of stacked resonator array panel stages, each resonator array panel stage including:
a perforated sheet including a sheet body, the sheet body including an exterior side surface and an interior side surface, the sheet body forming a plurality of neck portions, each neck portion of the plurality of neck portions surrounding and forming an aperture extending through the sheet body at least from the exterior side surface to the interior side surface; and
a resonator core disposed at the perforated sheet, the resonator core including a plurality of sidewalls, each sidewall contacting the interior side surface, the plurality of sidewalls forming a plurality of resonators, each resonator forming a resonator cavity, each resonator cavity in fluid communication with the aperture of at least one neck portion of the plurality of neck portions, wherein the at least one neck portion extends from a first neck end to a second neck end in an axial direction along a resonator centerline, the second neck end disposed within the resonator cavity and axially spaced from the interior side surface;
the plurality of stacked resonator array panel stages including a first resonator array panel stage and a second resonator array panel stage, the plurality of resonators of the first resonator array panel stage including a first resonator, the plurality of resonators of the second resonator array panel stage including a second resonator, the first resonator and the second resonator disposed about a common resonator centerline, the first resonator connected in fluid communication with the second resonator, each of the first resonator and the second resonator including a filler material body.

19. The resonator array panel of claim 18, wherein the filler material body of the first resonator is different than the filler material body of the second resonator.

* * * * *